US012673545B2

(12) United States Patent
Kashihara et al.

(10) Patent No.: US 12,673,545 B2
(45) Date of Patent: Jul. 7, 2026

(54) POWERTRAIN STRUCTURE OF VEHICLE

(71) Applicant: Mazda Motor Corporation, Aki-gun (JP)

(72) Inventors: Hiroaki Kashihara, Aki-gun (JP); Takayuki Sato, Aki-gun (JP); Masayuki Okazaki, Aki-gun (JP)

(73) Assignee: Mazda Motor Corporation, Aki-gun (JP)

( * ) Notice: Subject to any disclaimer, the term of this patent is extended or adjusted under 35 U.S.C. 154(b) by 253 days.

(21) Appl. No.: 18/732,922

(22) Filed: Jun. 4, 2024

(65) Prior Publication Data

US 2024/0416740 A1     Dec. 19, 2024

(30) Foreign Application Priority Data

Jun. 16, 2023     (JP) ................................. 2023-099090

(51) Int. Cl.
B60K 6/405 (2007.10)
B60K 6/26 (2007.10)
B60K 6/28 (2007.10)

(52) U.S. Cl.
CPC ............... B60K 6/405 (2013.01); B60K 6/26 (2013.01); B60K 6/28 (2013.01)

(58) Field of Classification Search
CPC . B60K 6/405; B60K 6/26; B60K 6/28; B60K 6/387; B60K 6/40; B60K 6/48; B60K 6/50; B60K 6/22; B60K 2006/4825; B60L 15/007
See application file for complete search history.

(56) References Cited

U.S. PATENT DOCUMENTS

| | | | | |
|---|---|---|---|---|
| 10,780,849 | B1 * | 9/2020 | Garcia | ............... B60R 16/0231 |
| 2013/0279114 | A1 * | 10/2013 | Nishikimi | ................ B60K 6/28 |
| | | | | 361/699 |
| 2018/0022202 | A1 * | 1/2018 | Urabe | .................... B60K 6/405 |
| | | | | 180/65.26 |
| 2020/0112281 | A1 * | 4/2020 | Ziegltrum | ............. B60L 15/007 |
| 2020/0313595 | A1 * | 10/2020 | Oguma | .................. H02P 27/08 |
| 2024/0399882 | A1 * | 12/2024 | Takahashi | ............... H02M 7/48 |
| 2024/0416740 | A1 * | 12/2024 | Kashihara | ................ B60K 6/28 |
| 2024/0416741 | A1 * | 12/2024 | Shiba | ..................... B60K 6/387 |
| 2025/0141362 | A1 * | 5/2025 | Kashihara | ............. H02M 7/003 |

FOREIGN PATENT DOCUMENTS

JP          6349415 B2     6/2018

* cited by examiner

*Primary Examiner* — Erez Gurari
(74) *Attorney, Agent, or Firm* — Alleman Hall LLP

(57) ABSTRACT

A powertrain structure of a vehicle includes an engine, a motor, a battery, a power converter, and a housing. The power converter includes a direct current (DC) busbar, a smoothing capacitor, a power module, and an alternating current (AC) busbar lined up in this order in a first direction, and a case accommodating these components. The case has a first accommodating part extending in a second direction and accommodating the power module, the smoothing capacitor, and the DC busbar, and a second accommodating part protruding downwardly from an end of the first accommodating part on one side in the second direction, and accommodating a lower part of the AC busbar. The case is disposed above an upwardly-bulging curved part of the housing so that the second accommodating part is offset from a top part of the curved part to the one side in the second direction.

6 Claims, 11 Drawing Sheets

1

POWERTRAIN STRUCTURE OF VEHICLE

TECHNICAL FIELD

The present disclosure relates to a powertrain structure of a vehicle.

BACKGROUND OF THE DISCLOSURE

Vehicles provided with an engine and a motor as a driving source for propelling the vehicle, and also provided with a battery which supplies electric power to the motor (so-called "hybrid vehicle") are known. Since such vehicles are necessary to convert direct current (DC) of the battery into alternating current (AC) in order to drive the motor, a power converter for performing the above-described conversion is additionally mounted on the vehicle.

For example, JP6349415B2 discloses a structure of a vehicle on which an engine, a motor, a battery, and a power converter are mounted, in which an upper surface of a case which accommodates the motor is fastened with a bottom surface of a power converter (a power control device in JP6349415B2), and the power converter is mounted above the case.

In this structure, the power converter is disposed in a space above the upper surface of the case which accommodates the motor. Therefore, a rate of the power converter occupying the space above the motor increases, and when installing other devices above the motor, the layout becomes difficult. Thus, there is room for improvement in the degree of freedom in the layout.

SUMMARY OF THE DISCLOSURE

The present disclosure is made in view of the above situations, and one purpose thereof is to provide a powertrain structure of a vehicle, capable of increasing the degree of freedom in the layout.

In order to achieve the above-described purpose, a powertrain structure of a vehicle according to the present disclosure includes an engine serving as a driving source configured to propel the vehicle and including an engine body where a combustion chamber is formed, a motor serving as a driving source configured to propel the vehicle, a battery configured to supply electric power to the motor, a power converter configured to convert direct current (DC) of the battery into alternating current (AC) and supply the alternating current to the motor, and a housing configured to accommodate the motor therein and disposed on one side of the engine body in a horizontal first direction. The power converter includes a DC busbar coupled to the battery, a smoothing capacitor configured to smooth the direct current inputted from the battery via the DC busbar and disposed on one side of the DC busbar in a horizontal second direction perpendicular to the first direction, a power module configured to convert the direct current smoothed by the smoothing capacitor into alternating current and disposed on one side of the smoothing capacitor in the second direction, an AC busbar configured to transmit alternating current generated by the power module to the motor and having a shape extending downwardly from the power module and being connected with the motor, and a case configured to accommodate the DC busbar, the smoothing capacitor, the power module, and the AC busbar. The case has a first accommodating part having a shape extending in the second direction, and accommodating the power module, the smoothing capacitor, and the DC busbar, and a second accommodating part having a shape protruding downwardly from an end of the first accommodating part on the one side in the second direction, and accommodating a lower part of the AC busbar. The housing includes a curved part with an outer circumferential surface curved so as to bulge upwardly when seen in the first direction. The case is disposed above the curved part in a state where a position of the second accommodating part is offset from a top part of the curved part to the one side in the second direction.

In this configuration, the three components which are the DC busbar, the smoothing capacitor, and the power module are lined up in the horizontal second direction. Therefore, dimensions of the spaces in the up-and-down direction occupied by the three components (that is, a dimension of the first accommodating part in the up-and-down direction which accommodates these three components) can be reduced. Further, the AC busbar extends downwardly from the power module. Therefore, as compared with a case where the AC busbar is disposed to extend toward the one side of the power module in the second direction, dimensions of spaces occupied by the DC busbar, the smoothing capacitor, the power module, and the AC busbar in the second direction (i.e., dimension of the case, or the first accommodating part and the second accommodating part, which accommodates these four components in the front-and-rear direction) can be reduced. In addition, the second accommodating part which protrudes downwardly from the end part of the first accommodating part on the one side in the second direction is provided to the case, and the lower part of the AC busbar is accommodated in the second accommodating part. Therefore, the AC busbar can be accommodated inside the case, while reducing the dimension of the first accommodating part in the up-and-down direction. Further, the case is disposed above the housing, in the state where the second accommodating part is offset to the one side in the second direction from the top part of the curved part. Therefore, the second accommodating part can be disposed in a space in the one side in the second direction from the curved part so that its bottom part is located lower than the top part of the curved part, and the heights of the first accommodating part and the second accommodating part (i.e., the height of the case) can be lowered. Therefore, according to the above configuration, the power converter can be disposed around the housing compactly with an increased degree of freedom in the layout.

In the above configuration, the engine body, the motor, and the power converter may be mounted on the vehicle in a posture in which the first direction is in agreement with a vehicle width direction, and the second direction is in agreement with a front-and-rear direction of the vehicle. The engine may have peripheral equipment disposed at a position on the one side of the engine body in the first direction, and separated upwardly from the housing. The power converter may be disposed at a position below the peripheral equipment and above the housing, and rearward of a front end of at least one of the engine and the housing.

According to this configuration, the power converter can be disposed utilizing the space between the peripheral equipment and the housing. Further, in this configuration, the power converter is located rearward of the front end of at least one of the engine body and the housing. Therefore, in a collision to the front of the vehicle, the engine body or the housing can collide, prior to the power converter, with a colliding object located forward of the powertrain to reduce a load applied to the power converter.

In the above configuration, the power converter may be mounted on the vehicle in a posture in which the one side in the second direction is in agreement with a front side in the front-and-rear direction of the vehicle. The housing may include a busbar insert part into which the AC busbar is inserted in the vehicle width direction and which is provided to a front end part of the housing.

According to this configuration, when assembling the powertrain, by moving the power converter in the vehicle width direction, the AC busbar can be inserted into the busbar insert part. Therefore, a dimension of a space in the up-and-down direction to be secured around the power converter, which is a work space required for inserting the AC busbar into the busbar insert part, can be reduced. Therefore, according to this configuration, insertion of the AC busbar into the busbar insert part is enabled, while the installation space of the power converter and the peripheral equipment can be secured by reducing the gap size in the up-and-down direction between the power converter and the peripheral equipment.

In the above configuration, the powertrain structure may further include a low-voltage battery with an output voltage lower than the battery, which is disposed above the power converter, and on the one side of the engine body in the first direction.

According to this configuration, the low-voltage battery can be disposed utilizing the space on the one side of the engine body in the first direction and above the power converter.

DETAILED DESCRIPTION OF THE DISCLOSURE (Overall Configuration)

Figure 1:
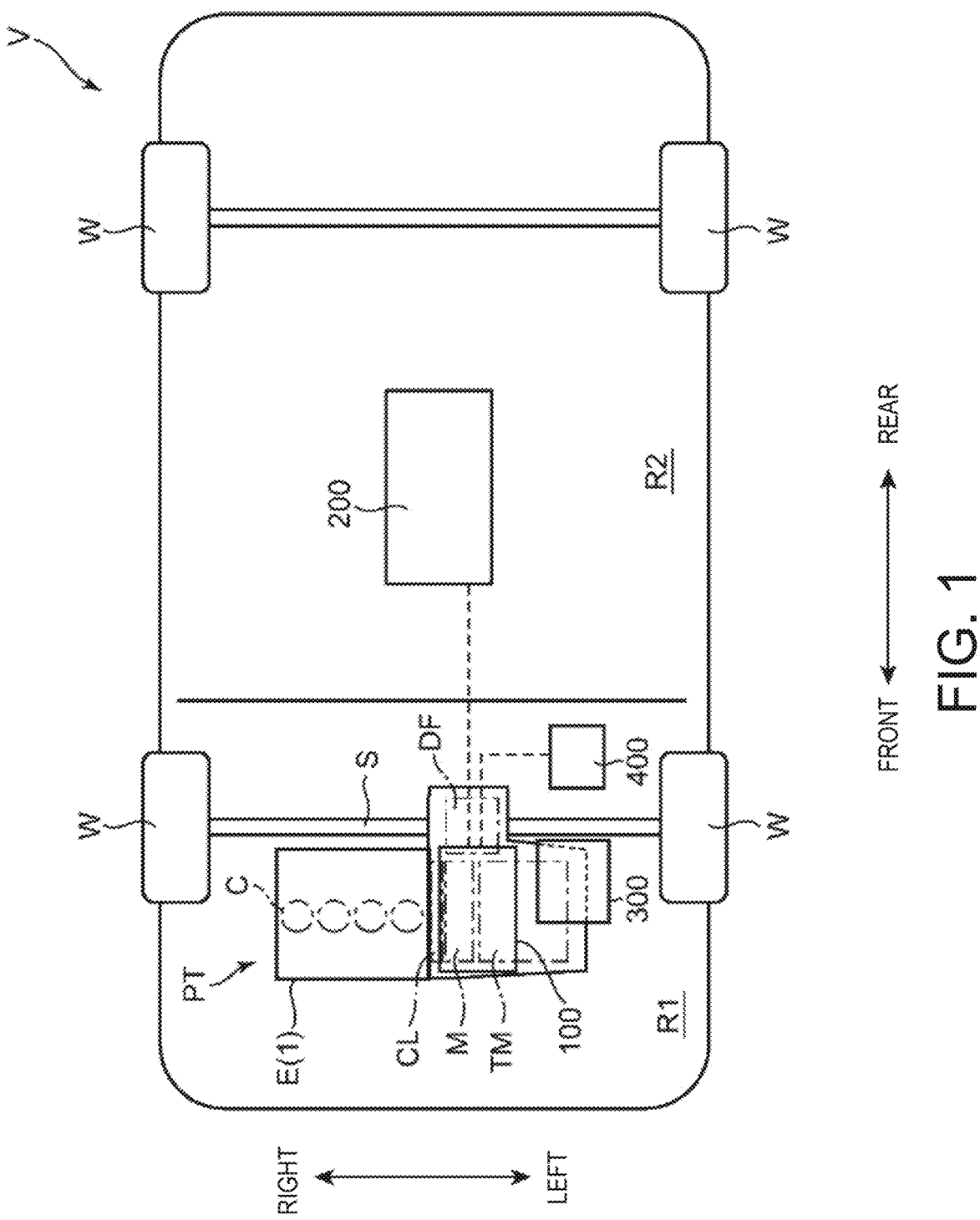
FIG. 1 is a system chart illustrating an outline configuration of a vehicle according to one embodiment of the present disclosure.

FIG. 1 is a system chart illustrating an outline configuration of a vehicle V to which a powertrain structure according to one embodiment of the present disclosure is applied. Below, a front-and-rear direction of the vehicle V is simply referred to as the "front-and-rear direction." Further, a width direction of the vehicle V, which is a left-and-right direction when a viewer faces the front is referred to as the "left-and-right direction." Note that in each drawing, front, rear, left, and right correspond to the above-described directions. In this embodiment, the left-and-right direction is an example of a "first direction" in the present disclosure, and the left side is an example of "one side in the first direction" in the present disclosure. Further, the front-and-rear direction is an example of a "second direction" in the present disclosure, and the front side is an example of "one side in the second direction" in the present disclosure.

A powertrain module PT, a power converter 100, a high-voltage battery 200, and a low-voltage battery 300 are mounted on the vehicle V.

The vehicle V is a so-called "hybrid vehicle," which carries an engine E and a motor M which function as driving sources for propelling the vehicle V (wheels W). The powertrain module PT includes the engine E (in detail, an engine body 1 which will be described later), and the motor M. The powertrain module PT includes a clutch CL, a transmission TM, and a differential gear DF, in addition to the engine E and the motor M.

The motor M includes an output shaft, a rotor having permanent magnets provided around the output shaft, and a stator comprised of a plurality of coils disposed around the outer circumference of the rotor. The output shaft (rotor) is rotated by supplying alternating current with different phases to the plurality of coils of the stator. In this embodiment, the motor M is a three-phase alternating current (AC) synchronous motor, which has a U-phase coil, a V-phase coil, and a W-phase coil. Current with different phases are supplied to the coils.

The clutch CL disconnectably connects the motor M with the engine E. The transmission TM is connected with the motor M, and reduces the speed of rotation (changes the gear stage) inputted from the motor M and outputs the reduced rotation. The differential gear DF transmits the rotation outputted from the transmission TM to the wheels W via drive shafts S. The vehicle V is a parallel-type hybrid vehicle, which is capable of traveling only by a driving force of the motor M, traveling by a driving force of both the motor M and the engine E, and traveling only by a driving force of the engine E. In detail, when the clutch CL is disconnected, only the driving force of the motor M is given to the wheels W. On the other hand, when the clutch CL is connected and the motor M does not generate the driving force, only the driving force of the engine E is given to the wheels W. Further, when the clutch CL is connected and the motor M generates the driving force, the driving forces of the engine E and the motor M are given to the wheels W. The vehicle V is a vehicle capable of performing regenerative deceleration so that the motor M generates electric power by a rotational force transmitted from the wheels W when the vehicle V decelerates.

The high-voltage battery 200 is a battery which supplies and receives electric power to/from the motor M. When the motor M drives as the driving source for propelling the vehicle, the high-voltage battery 200 supplies the electric power to the motor M. On the other hand, when the motor M drives as a generator, the high-voltage battery 200 stores electric power generated by the motor M.

The power converter 100 converts direct current (DC) of the high-voltage battery 200 into alternating current (AC), and supplies it to the motor M. In detail, the power converter 100 converts direct current into three-phase alternating current. Further, when the motor M drives as the generator, the power converter 100 converts the alternating current generated by the motor M into direct current, and supplies it to the high-voltage battery 200.

The low-voltage battery 300 is a battery which supplies electric power to electrical components provided to various parts of the vehicle V. The low-voltage battery 300 is a battery of which a nominal voltage (output voltage) is smaller than the high-voltage battery 200. For example, the high-voltage battery 200 is a lithium-ion battery or a nickel-hydrogen battery with the nominal voltage of 24V or higher, and the low-voltage battery 300 is a lead battery or a lithium-ion battery with the nominal voltage of 12V or 24V.

In this embodiment, the powertrain module PT, the power converter 100, and the low-voltage battery 300 are accommodated in a powertrain room R1 defined in a front part of the vehicle V. The high-voltage battery 200 is accommodated in a lower part of a cabin R2 defined behind the powertrain room R1.

(Engine)

Figure 2:
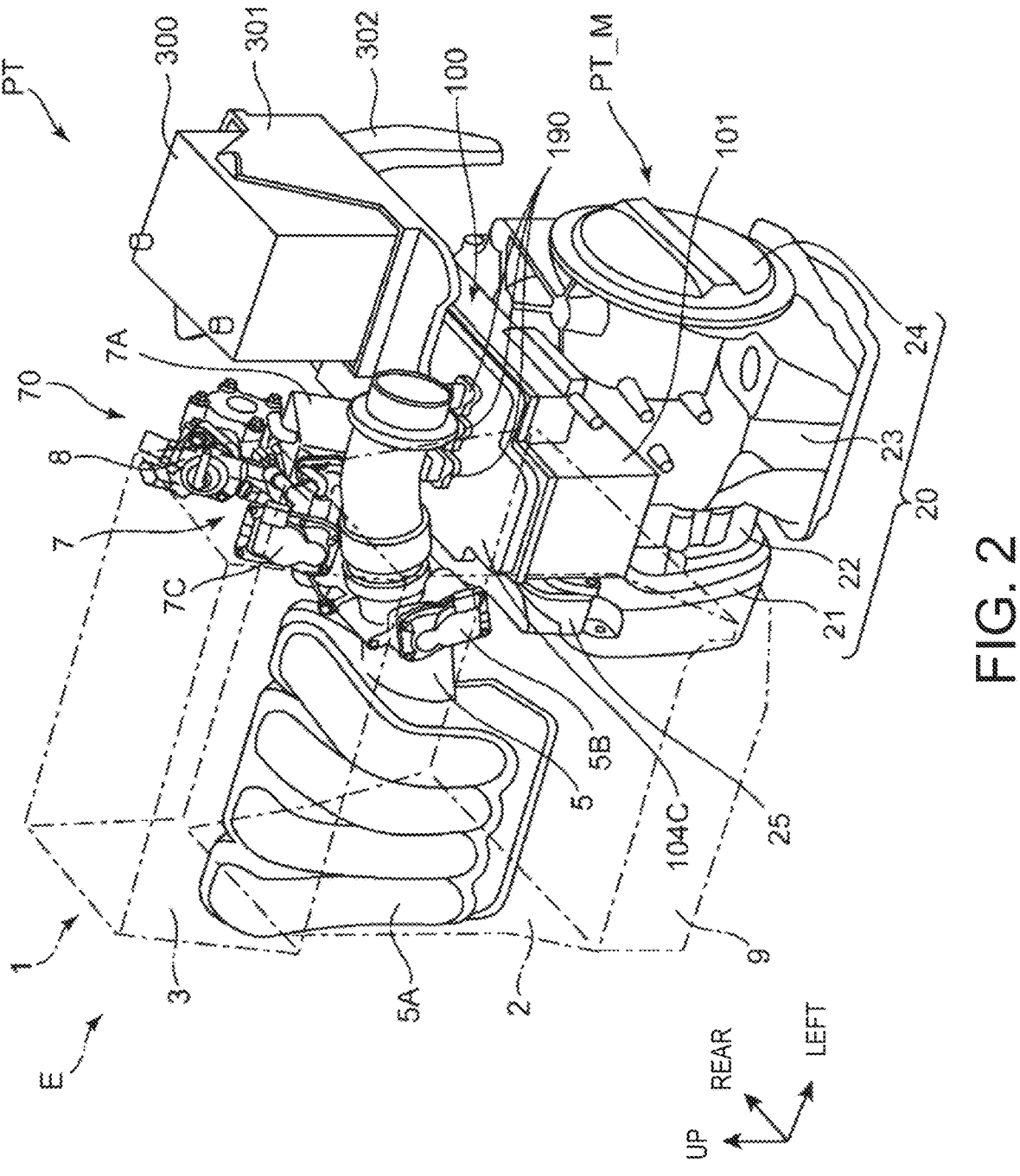
FIG. 2 is an outline perspective view of a powertrain module.
Figure 3:
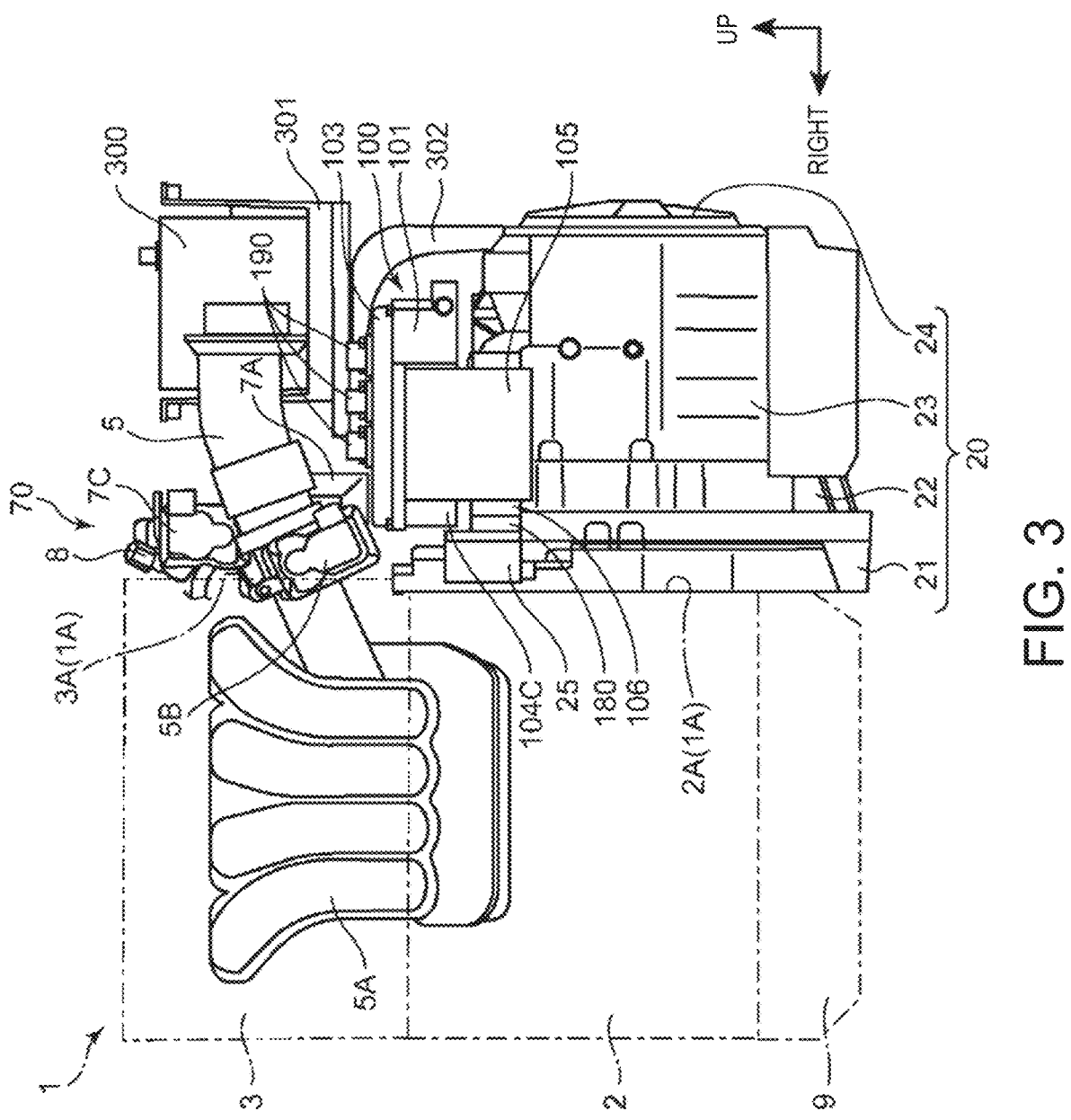
FIG. 3 is an outline side view of the powertrain module, when seen from the front.
Figure 4:
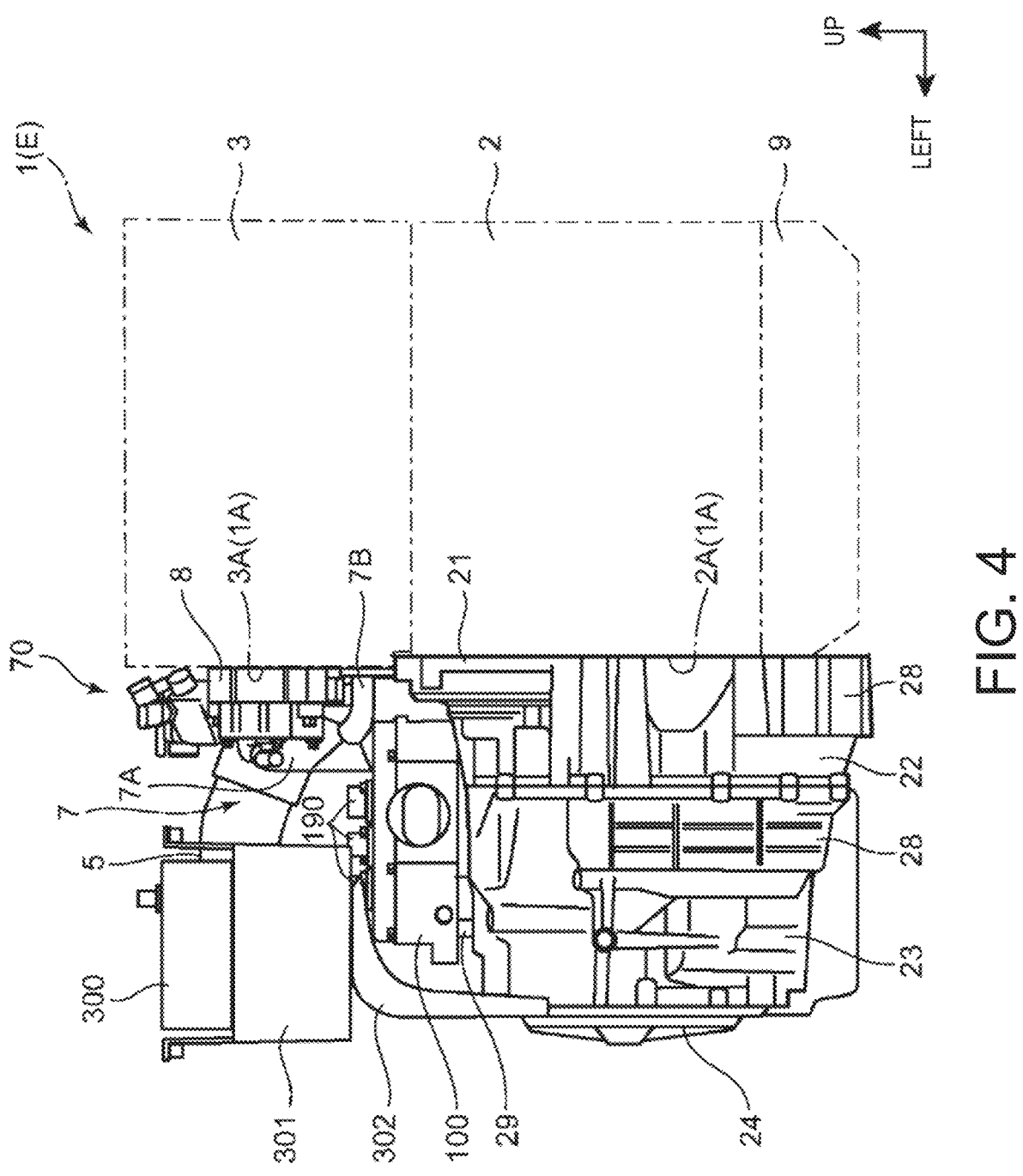
FIG. 4 is an outline side view of the powertrain module, when seen from the rear.
Figure 5:
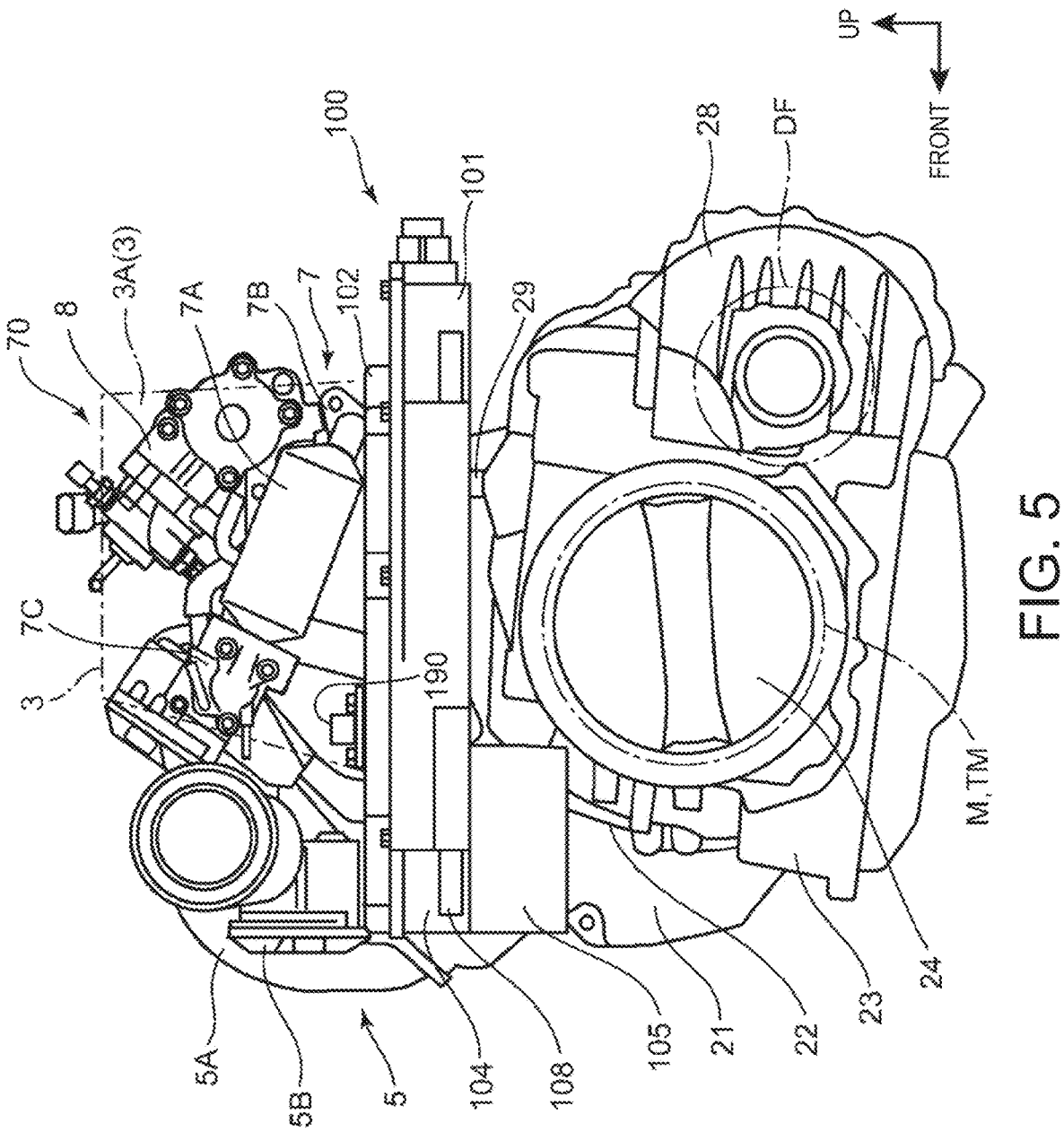
FIG. 5 is an outline side view of the powertrain module, when seen from the left.
Figure 6:
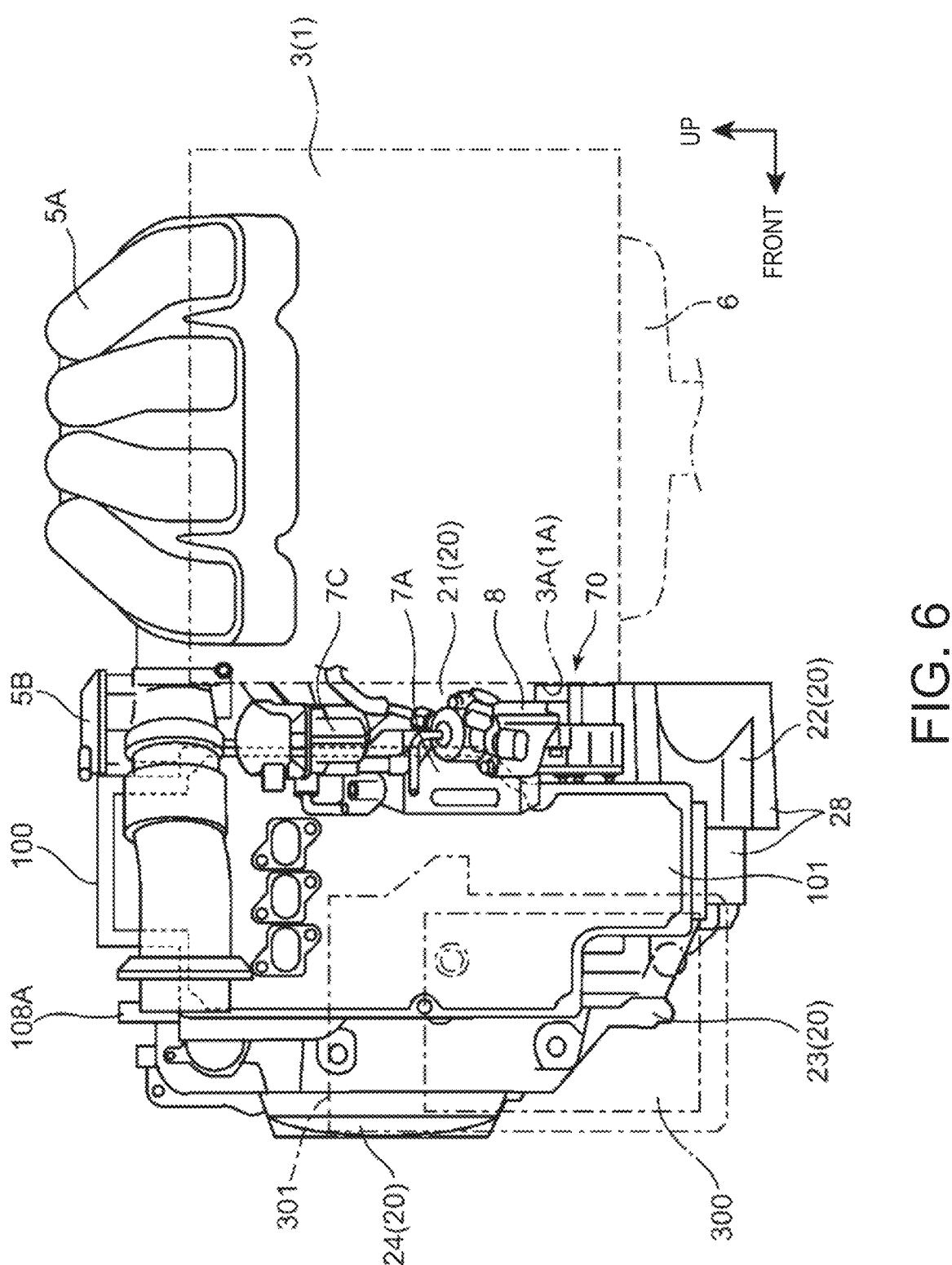
FIG. 6 is an outline top view of the powertrain module.

FIG. 2 is an outline perspective view of the powertrain module PT and its periphery. FIGS. 3 to 5 are outline side views of the powertrain module PT and its periphery. FIG. 3 is a view of the powertrain module PT when seen from the front, FIG. 4 is a view of the powertrain module PT when seen from the rear, and FIG. 5 is a view of the powertrain module PT when seen from the left. FIG. 6 is an outline top view of the powertrain module PT and its periphery. Note that, in FIG. 5, illustration of the low-voltage battery 300 is omitted. Further, in FIG. 6, the low-voltage battery 300 is illustrated by a one-dot chain line.

The engine E is provided with the engine body 1 where a combustion chamber C is formed. The engine body 1 is a reciprocating internal combustion engine, which includes a cylinder block 2 where a cylinder (not illustrated) is formed, a cylinder head 3 which covers the cylinder block 2 from above, a piston (not illustrated) which is inserted in the cylinder so as to be reciprocatable in the up-and-down direction, and a crankshaft (not illustrated) which rotates in association with the reciprocating motion of the piston. The engine E is also provided with an oil pan 9 which is coupled to a lower surface of the cylinder block 2 and stores lubricant. Note that the combustion chamber C is a space defined by an inner circumferential surface of the cylinder, a crown surface of the piston, and a bottom surface of the cylinder head 3. In this embodiment, the engine body 1 is an in-series four-cylinder engine, and is provided with four cylinders and four combustion chambers C which are lined up along a rotation axis of the crankshaft.

The engine E includes an intake passage 5 where intake air (air) introduced into the engine body 1 circulates, and an exhaust passage 6 where exhaust gas (burnt gas) drawn from the engine body 1 circulates. Note that the exhaust passage 6 is partially illustrated by a one-dot chain line only in FIG. 6.

As described above, in this embodiment, the engine body 1 has the four combustion chambers C. Corresponding to this, the intake passage 5 is provided with an intake manifold 5A having four passages which introduce intake air into the respective combustion chambers C. The intake manifold 5A is coupled to the cylinder head 3. Further, a throttle valve unit 5B including a throttle valve which opens and closes the intake passage 5, and an actuator which drives the throttle valve is provided to the intake passage 5 upstream of the intake manifold 5A.

The engine E is disposed in the powertrain room R1 in a posture in which the crankshaft extends in the left-and-right direction, and the combustion chambers C (cylinders) are lined up in the left-and-right direction. That is, the engine E is transversely disposed in the vehicle V. Further, the engine E is disposed in the powertrain room R1 in a posture in which the intake manifold 5A is located forward of the engine body 1.

Various kinds of apparatuses provided to the engine E are disposed on the left side of an upper part of the engine body 1. In this embodiment, an exhaust gas recirculation (EGR) cooler 7A, an EGR cooler connecting part 7B, an EGR valve unit 7C, and a fuel pump 8 are disposed on the left side of the cylinder head 3. The EGR cooler 7A, the EGR cooler connecting part 7B, the EGR valve unit 7C, and the fuel pump 8 are an example of "peripheral equipment" in the present disclosure.

In detail, the engine E has an EGR system 7 which recirculates to the intake passage 5 a part of exhaust gas which circulates the exhaust passage 6 including an EGR passage which communicates the exhaust passage 6 with the intake passage 5 (EGR gas). The EGR system 7 has the EGR cooler 7A which is provided at an intermediate location of the EGR passage and cools the EGR gas. Further, the EGR system 7 has the EGR valve unit 7C including an EGR valve which opens and closes the EGR passage, and an actuator which drives the EGR valve. The EGR cooler 7A has a substantially rectangular parallelepiped shape extending in the flow direction of the EGR gas. The EGR cooler 7A is disposed on the left side of the cylinder head 3 in a posture in which it extends in the front-and-rear direction, and its upstream end is located on the rear side and its downstream end is located on the front side. The EGR valve unit 7C is attached to a front end of the EGR cooler 7A, is disposed on the left side near a front end part of the cylinder head 3, and is connected to the intake passage 5. A part of the EGR passage is formed inside the cylinder head 3, and inside of the cylinder head 3, the EGR passage communicates with the exhaust passage 6. The EGR passage formed inside the cylinder head 3 opens in a rear part of a left side surface 3A of the cylinder head 3. The EGR system 7 has the EGR cooler connecting part 7B which couples the opening of the EGR passage formed in the left side surface 3A of the cylinder head 3 to an upstream end of the EGR cooler 7A. The EGR cooler connecting part 7B is disposed on the left side of the rear part of the cylinder head 3.

Further, the engine E has a fuel supply which supplies fuel to the combustion chamber C, and the fuel pump 8 which pumps the fuel to the fuel supply. The fuel pump 8 is disposed on the left side of the cylinder head 3 and above the EGR cooler 7A and the EGR cooler connecting part 7B.

The position in the left-and-right direction of the left side surface 3A of the cylinder head 3 is substantially the same as the position in the left-and-right direction of a left side surface 2A of the cylinder block 2. Thus, the EGR cooler 7A, the EGR cooler connecting part 7B, the EGR valve unit 7C, and the fuel pump 8 which are disposed on the left side of the cylinder head 3 are located on the left side of a left side surface 1A of the engine body 1 comprised of the left side surface 2A of the cylinder block 2 and the left side surface 3A of the cylinder head 3. That is, these apparatuses 7A, 7B, 7C, and 8 are disposed so as to protrude to the left side from the left side surface 1A of the engine body 1. Below, the EGR cooler 7A, the EGR cooler connecting part 7B, the EGR valve unit 7C, and the fuel pump 8 are suitably referred to as a "specific apparatus 70."

(Motor-Side Powertrain Module)

A powertrain module PT_M on the motor M side which is a part of the powertrain module PT excluding the engine E (engine body 1) is disposed on the left side of the engine body 1.

In detail, a housing 20 where a space is defined inside is fastened to the left side surface 2A of the cylinder block 2, and the clutch CL, the motor M, the transmission TM, and the differential gear DF are accommodated in the housing 20. Inside the housing 20, the clutch CL, the motor M, and the transmission TM are lined up in this order from the right side. Inside the housing 20, the differential gear DF is disposed rearward of the motor M and the transmission TM.

In this embodiment, the housing 20 is comprised of a plurality of members. In detail, the housing 20 has a front cover 21 fastened to the left side surface 2A of the cylinder block 2, a motor housing 22 fastened to a left side surface of the front cover 21, an axle housing 23 fastened to a left side surface of the motor housing 22, and an axle housing cover 24 fastened to a left side surface of the axle housing 23.

Each of the motor housing 22 and the axle housing 23 has a substantially cylindrical shape of which the center axis extends in the left-and-right direction, and an outer circumferential surface of an upper part of each of the motor housing 22 and the axle housing 23 curves so as to bulge upwardly, when seen in the left-and-right direction. The axle housing cover 24 is a substantially disk-shaped member, and it is fastened to the axle housing 23 so as to cover the opening on the left side of the axle housing 23.

The clutch CL and the motor M are mainly disposed inside the front cover 21 and the motor housing 22. The motor M is supported by the front cover 21 so that its output shaft extends in the left-and-right direction, and is rotatable on this axis. The transmission TM is mainly disposed inside the axle housing 23.

The differential gear DF is mainly disposed in a rear part of the axle housing 23. In detail, the motor housing 22 and the axle housing 23 have a part which bulges rearwardly, and the differential gear DF is accommodated inside both the bulged parts. That is, the housing 20 has a differential case 28 which is comprised of a rear part of the motor housing 22 and the axle housing 23 as an accommodating part of the differential gear DF.

The front cover 21, the motor housing 22, and the axle housing 23 are lined up in the left-and-right direction so that their center axes extend along the substantially same line. Outer diameters of the motor housing 22 and the axle housing 23 are set as the substantially same size, and outer circumferential surfaces of the two housings 22 and 23 continue in the left-and-right direction in general. On the other hand, the maximum length of the front cover 21 in the up-and-down direction is larger than the maximum lengths of the motor housing 22 and the axle housing 23 in the up-and-down direction, and the front cover 21 extends in the up-and-down direction up to a position above upper edges of the motor housing 22 and the axle housing 23. Further, the front cover 21 extends in the front-and-rear direction up to a position forward of front edges of the motor housing 22 and the axle housing 23. That is, a front end of the front cover 21 is located forward of front ends of the motor housing 22 and the axle housing 23. Further, the front cover 21 is fastened to the engine body 1 so that its front end position is located forward of a front end position of the engine body 1.

Figure 7:
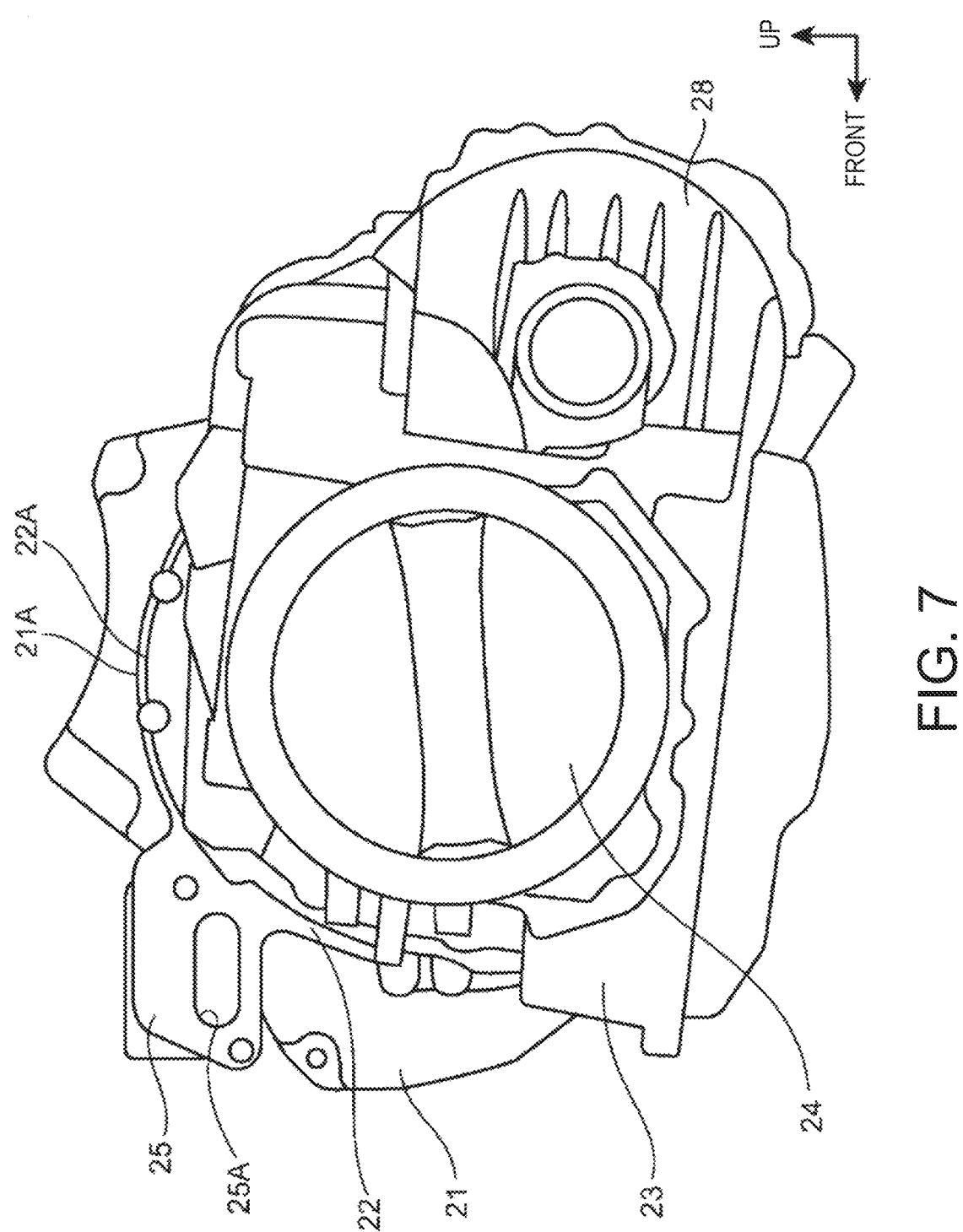
FIG. 7 is a view of a state where an engine and a power converter are removed from the state illustrated in FIG. 5.

FIG. 7 is a view illustrating a state where the engine E and the power converter 100 are removed from the state illustrated in FIG. 5. As illustrated in FIG. 7, a busbar insert part 25 into which an AC busbar 115 (described later) of the power converter 100 is inserted is provided to the front end parts of the front cover 21 and the motor housing 22.

The busbar insert part 25 is provided to an upper part of the front end part of the front cover 21 and the upper part of the motor housing 22 which opposes thereto. In detail, the motor housing 22 has a motor housing body part 22A surrounding the motor M. The front cover 21 includes a motor housing coupling part 21A having substantially the same outer diameter as the motor housing body part 22A, and the motor housing body part 22A is coupled to the motor housing coupling part 21A. A left part of the busbar insert part 25 is provided to the motor housing 22, and it protrudes forward from a position slightly offset forward and downward from an upper end part of the outer circumferential surface of the motor housing body part 22A. A right part of the busbar insert part 25 is provided to the front cover 21, and it protrudes forward from a position slightly offset forward and downward from an upper end of the outer circumferential surface of the motor housing coupling part 21A. The busbar insert part 25 has a substantially rectangular parallelepiped shape extending in the front-and-rear direction. An opening 25A which opens to the left is formed on the left side surface of the busbar insert part 25.

Here, as described above, the busbar insert part 25 has a shape which protrudes forward from the motor case body part 22A and the motor housing coupling part 21A. Note that a part of the front cover 21 located on the right side of the motor housing coupling part 21A extends up to a position forward of the busbar insert part 25. Thus, the front end of the busbar insert part 25 is located rearward of the front end of the front cover 21.

(Power Converter)

Figure 8:
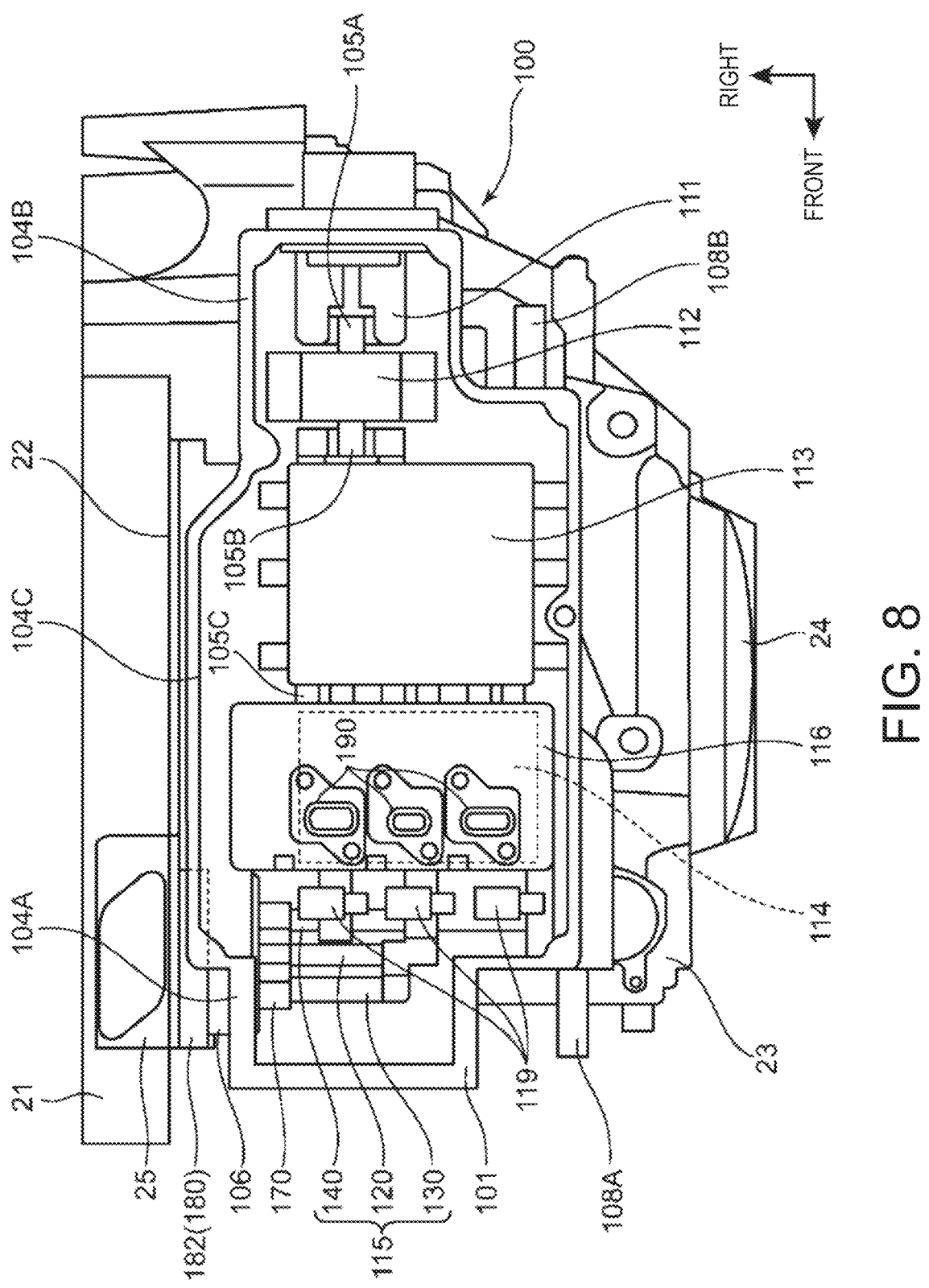
FIG. 8 is an outline top view illustrating the periphery of the power converter in a state where an upper lid is removed.
Figure 9:
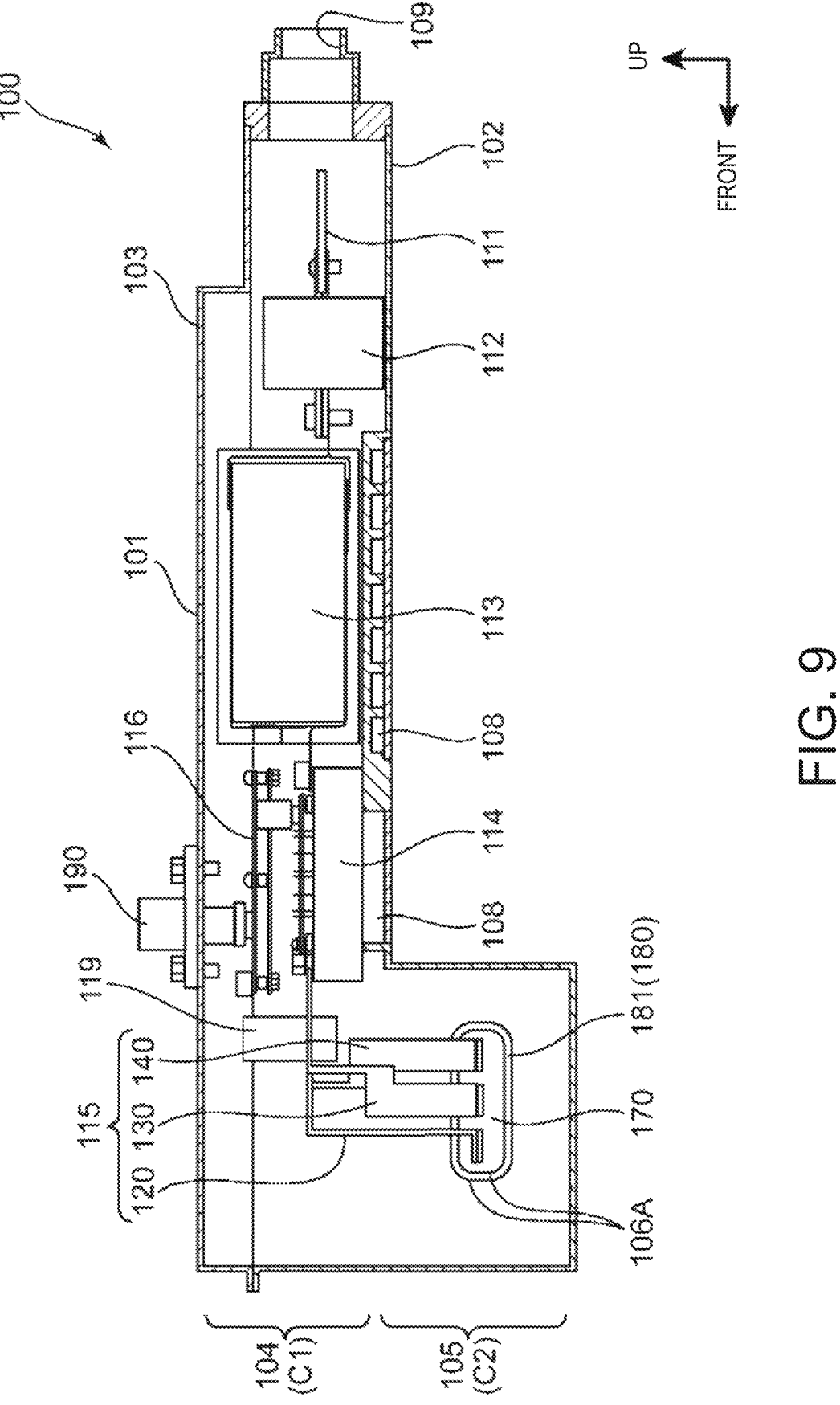
FIG. 9 is an outline cross-sectional view illustrating an internal structure of the power converter.

FIG. 8 is an outline top view illustrating the periphery of the power converter 100. In FIG. 8, the power converter 100 in a state where an upper lid 103 (described later) is removed from a case 101 (described later) is illustrated. FIG. 9 is an outline cross-sectional view illustrating an internal structure of the power converter 100.

The power converter 100 includes a filter 112, a smoothing capacitor 113, a power module 114, a control circuit board 116, and the case 101 which accommodates these components inside. Further, the power converter 100 is provided with a plurality of busbars. The busbar is a component formed by a metal plate. The power converter 100 includes a DC busbar 111 which is a busbar coupled to the high-voltage battery 200, and the AC busbar 115 coupled to the motor M. Further, the power converter 100 has a current sensor 119 for detecting current that flows through the AC busbar 115.

The DC busbar 111 receives direct current from the high-voltage battery 200. When the motor M drives as a generator, the DC busbar 111 sends out direct current toward the high-voltage battery 200. The filter 112 is an electromagnetic compatibility (EMC) countermeasure component, which removes noise. The filter 112 is electrically connected with the DC busbar 111. Here, the electrical connection includes a connection through electromagnetic induction or capacitive coupling. In this embodiment, a ferrite core which has a cylindrical shape, and is connected in the electromagnetic induction fashion with the DC busbar 111, without directly contacting the DC busbar, is used as the filter 112. Note that a coil, a ferrite bead, a transformer for EMC countermeasure, an X capacitor, and a Y capacitor may be used as the filter 112. The smoothing capacitor 113 is a capacitor for smoothing the direct current. The smoothing capacitor 113 is electrically connected with the filter 112. The power module 114 is a main component for converting the direct current into alternating current. The power module 114 is comprised of a semiconductor device. In detail, the power module 114 includes parts corresponding to U, V, and W phases, and each phase is constituted by a combination of a plurality of ICs (integrated circuits) including power semiconductors, such as an IGBT (Insulated Gate Bipolar Transistor), and a MOSFET (Metal Oxide Semiconductor Filed Effect Transistor). The power module 114 is electrically connected to the smoothing capacitor 113.

The AC busbar 115 is electrically connected with the power module 114. The AC busbar 115 transmits alternating current generated by the power module 114 to the motor M. Further, when the motor M drives as a generator, the AC busbar 115 receives the alternating current from the motor M, and transmits it to the power module 114. The AC busbar 115 includes a U-phase AC busbar 120 connected to the part corresponding to the U-phase of the power module 114, a V-phase AC busbar 130 connected to the part corresponding to the V-phase of the power module 114, and a W-phase AC busbar 140 connected to the part corresponding to the W-phase of the power module 114.

The direct current outputted from the high-voltage battery 200 is inputted into the filter 112 via the DC busbar 111 to remove noise. The direct current after the noise removal is inputted into the smoothing capacitor 113 to be smoothed by the smoothing capacitor 113. Then, the smoothed direct current is converted into three-phase alternating current by the power module 114, and it is supplied to the motor M via the AC busbar 115. Further, when the motor M drives as a generator, the alternating current generated by the motor M is inputted into the power module 114 via the AC busbar 115 to be converted into direct current by the power module 114. Then, after the generated direct current passes through the smoothing capacitor 113 and the filter 112, it is charged in the high-voltage battery 200 via the DC busbar 111.

The control circuit board 116 controls each IC of the power module 114 to change a conversion amount between direct current and alternating current. A powertrain control module (PCM) 400 which is a controller for totally controlling the components of the vehicle V including the motor M and the engine E is mounted on the vehicle V. The control circuit board 116 is electrically connected with the PCM 400 and the power module 114, and transmits a control signal to each IC of the power module 114 based on a command signal from the PCM 400.

The case 101 (as well as the power converter 100) is disposed on the left side of the engine body 1, and above the housing 20. The case 101 is supported by the housing 20 via a support member 29. In this embodiment, the low-voltage battery 300 is disposed above the case 101 (as well as the power converter 100) and on the left side of the engine body 1. In detail, the low-voltage battery 300 is disposed at a position where its right part overlaps with a rear part and a left part of the case 101 in the plan view (when seen from above). Further, the low-voltage battery 300 is disposed at a position where it entirely overlaps with the engine body 1, when seen in the left-and-right direction. Note that the low-voltage battery 300 is held at the above-described position via a battery support member 301 which supports the low-voltage battery 300 from below, and a battery bracket 302 fixed to the vehicle body.

The case 101 is a box-shaped member extending in a given direction. The case 101 is disposed on the left side of the engine body 1 in a posture in which the appeared shape in the plan view becomes a substantially rectangle extending in the front-and-rear direction. The case 101 has a first accommodating part 104 which constitutes its upper part, and a second accommodating part 105 which protrudes downwardly from a front end part of the first accommodating part 104. The first accommodating part 104 defines a first space C1 of a substantially rectangular parallelepiped shape extending in the front-and-rear direction, and the second accommodating part 105 defines a second space C2 of a substantially rectangular parallelepiped shape which communicates with a front end part of the first space C1 and extends in the up-and-down direction.

The case 101 has a case body 102 made of metal, which opens upwardly, and the upper lid 103 fixed to the opening part in the upper surface of the case body 102. The first accommodating part 104 is constituted by the upper part of the case body 102 and the upper lid 103, and the second accommodating part 105 is constituted by the case body 102.

The case 101 is disposed above the motor housing 22 and the axle housing 23 in the housing 20. The case 101 is disposed above the motor housing 22 and the axle housing 23 so that the position of the second accommodating part 105 is offset forward from the positions of the upper end parts of the outer circumferential surfaces of the motor housing 22 and the axle housing 23. That is, as described above, the outer circumferential surfaces of the upper parts of the motor housing 22 and the axle housing 23 are curved so as to bulge upwardly, and the second accommodating part 105 is disposed at a position offset forward from the top part of the curved outer circumferential surfaces of the upper parts of the motor housing 22 and the axle housing 23. Here, the upper parts of the motor housing 22 and the axle housing 23 correspond to a "curved part" of the present disclosure.

The case 101 is disposed so that the bottom surface of the first accommodating part 104 extends in the front-and-rear direction and passes through a position slightly above the upper end parts of the motor housing 22 and the axle housing 23. Thus, the clearances in the up-and-down direction between the bottom surface of the first accommodating part 104 and the upper end parts of the motor housing 22 and the axle housing 23 are minimized. Further, such clearances are reduced to the dimension smaller enough than the length of the second accommodating part 105 in the up-and-down direction. Thus, the second accommodating part 105 is located forward of the outer circumferential surfaces of the motor housing 22 and the axle housing 23, and extends in the up-and-down direction from a position slightly above the upper end parts of the motor housing 22 and the axle housing 23 to a position below the upper end parts.

The case 101 is disposed in the front-and-rear direction so that its center in the front-and-rear direction becomes substantially the same as the positions of the upper end parts of the motor housing 22 and the axle housing 23. Further, the case 101 extends rearwardly from a position forward of the front ends of the motor housing 22 and the axle housing 23. Note that the case 101 is disposed rearward of the front end of the front cover 21, and the front end position of the case 101 is located rearward of the front end of the front cover 21 (i.e., the front end position of the housing 20).

The case 101 is disposed in the up-and-down direction at a position below the specific apparatus 70. That is, the specific apparatus 70 is disposed in the up-and-down direction at a position separated upwardly from the motor housing 22 and the axle housing 23, and the case 101 is disposed in the up-and-down direction between the motor housing 22 and the axle housing 23, and the specific apparatus 70.

Further, the case 101 is disposed at a position where a part thereof overlaps with the specific apparatus 70 is the plan view. In detail, the case 101 has a shape which protrudes in the left-and-right direction at the center in the front-and-rear direction. That is, the case 101 includes a front accommodating part 104A which constitutes a front end part when dividing the case 101 based on the shape seen from above, a rear accommodating part 104B which constitutes a rear end part, and a center accommodating part 104C located between the front accommodating part 104A and the rear accommodating part 104B. The center accommodating part 104C has a dimension in the left-and-right direction larger than the front accommodating part 104A and the rear accommodating part 104B, and has a shape which bulges outwardly in the left-and-right direction from the front accommodating part 104A and the rear accommodating part 104B. A right end part of the center accommodating part 104C in the case 101 is disposed between the motor housing 22 and the axle housing 23, and the specific apparatus 70, and this right end part of the center accommodating part 104C overlaps with the specific apparatus 70 in the plan view. Note that the second accommodating part 105 is comprised of a lower part of the front accommodating part 104A, and a lower part of the front part of the center accommodating part 104C.

Three connectors 190 for communication which protrude upwardly are provided to the upper surface of the case 101. The three connectors 190 for communication are lined up in the left-and-right direction. The connectors 190 for communication is a part to which a wire harness extending from the PCM 400 is connected, and is electrically connected with the PCM 400 via the wire harness. The connector 190 for communication is electrically connected with the control circuit board 116 inside the case 101, and by coupling the wire harness to the connector 190 for communication, the control circuit board 116 is electrically connected with the PCM 400 via the connector 190 for communication and the wire harness.

Further, a cooling structure for cooling the power module 114 is provided to the case 101. In detail, a cooling channel 108 for circulating coolant is formed in a lower part of the case 101. Further, coolant entrance parts 108A and 108B which communicate with the cooling channel 108 to introduce and discharge the coolant into/from the cooling channel 108 are provided to the lower part of the case 101.

The DC busbar 111 has a plate shape, and is disposed at a rear end of the first accommodating part 104 in a posture extending substantially horizontally. A through-hole 109 which communicates the inside of the case 101 with the outside is formed in a rear end part of the case body 102. By coupling the busbar (not illustrated) electrically connected to the high-voltage battery 200 to the DC busbar 111 through the through-hole 109, the DC busbar 111 (as well as the power converter 100) is electrically connected with the high-voltage battery 200.

The filter 112 has a substantially rectangular parallelepiped outside shape. The filter 112 is disposed forward of the DC busbar 111 in a posture extending in the left-and-right direction. The filter 112 and the DC busbar 111 are connected to each other via a first coupling busbar 105A disposed therebetween.

The smoothing capacitor 113 has a substantially rectangular parallelepiped outside shape. The smoothing capacitor 113 has a substantially square shape in the plan view. That is, the smoothing capacitor 113 has substantially-square upper and bottom surfaces. The smoothing capacitor 113 is disposed forward of the filter 112 in a posture in which two sides of its upper surface (and bottom surface) become substantially parallel with each other in the front-and-rear direction. The filter 112 and the smoothing capacitor 113 are connected to each other via a second coupling busbar 105B disposed therebetween.

The power module 114 has a substantially rectangular parallelepiped outside shape as a whole. The power module is disposed forward of the filter 112 in a posture extending in the left-and-right direction as a whole. The smoothing capacitor 113 and the power module 114 are connected to each other by a third coupling busbar 105C disposed therebetween. The power module 114 is disposed forward of the filter 112 in a posture in which its part corresponding to the U-phase, the part corresponding to the V-phase, and the part corresponding to the W-phase are lined up in the left-and-right direction.

The DC busbar 111, the filter 112, and the smoothing capacitor 113 are accommodated inside the first accommodating part 104. As described above, the DC busbar 111, the filter 112, and the smoothing capacitor 113 are lined up in this order from the rear to the front inside the first accommodating part 104. Further, when the case 101 is divided into the front accommodating part 104A, the rear accommodating part 104B, and the center accommodating part 104C, the DC busbar 111 and the filter 112 are accommodated inside the rear accommodating part 104B, and the smoothing capacitor 113 and the power module 114 are accommodated inside the center accommodating part 104C.

The control circuit board 116 is a substantially plate shape member, and has a substantially rectangular outside shape. The control circuit board 116 is accommodated inside the first accommodating part 104 in a posture extending substantially horizontally and extending in the left-and-right direction. Further, when the case 101 is divided into the front accommodating part 104A, the center accommodating part 104C, and the rear accommodating part 104B, the control circuit board 116 is accommodated inside the center accommodating part 104C.

The control circuit board 116 is disposed above the power module 114. The control circuit board 116 is disposed so that it covers substantially the whole power module 114 from above and protrudes to the right side from the power module 114 in the plan view. In detail, the length of the control circuit board 116 in the longitudinal direction (left-and-right direction) is set longer than the length of each side of the upper surface (and the bottom surface) of the power module 114. The control circuit board 116 is disposed in the front-and-rear direction so that a front edge of the control circuit board 116 is located at substantially the same position as a front edge of the power module 114, and a rear edge of the control circuit board 116 is located at substantially the same position as a rear edge of the power module 114. Further, the control circuit board 116 is disposed in the left-and-right direction so that a left edge of the control circuit board 116 is located at substantially the same position as a left edge of the power module 114, and a right edge of the control circuit board 116 is located on the right side of a right edge of the power module 114.

Figure 10:
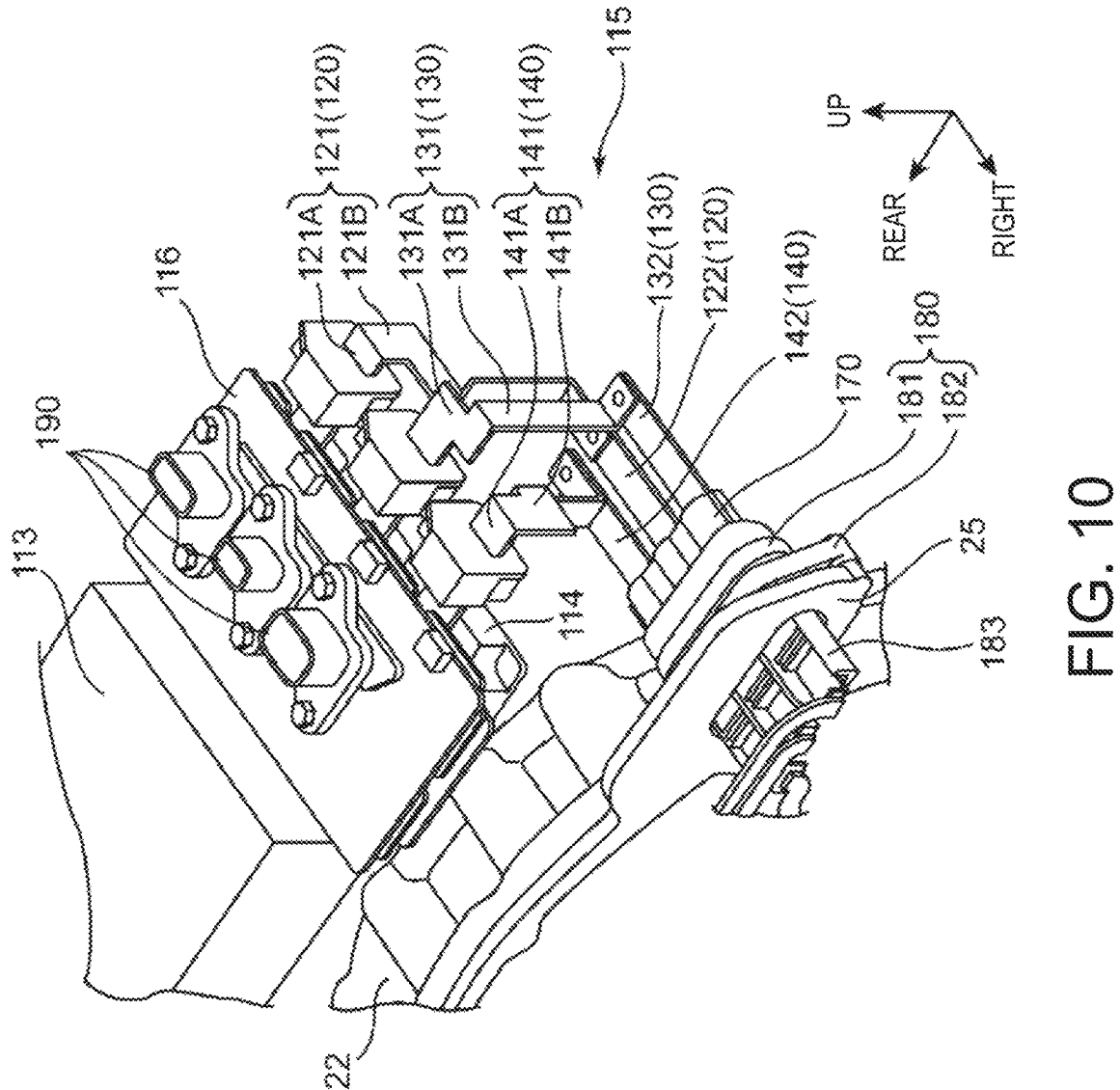
FIG. 10 is an outline perspective view illustrating a peripheral structure of an alternating current (AC) busbar and a busbar insert part.
Figure 11:
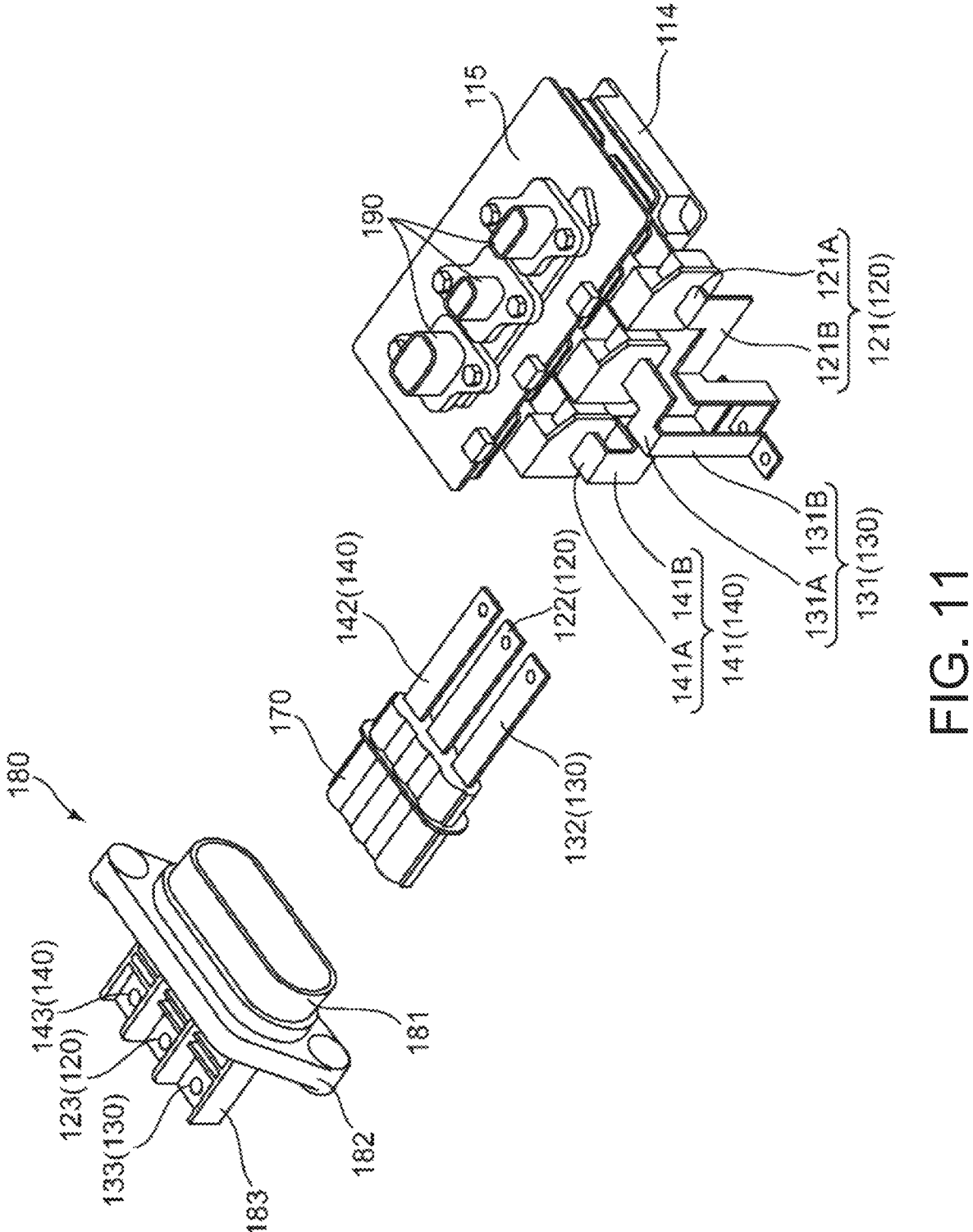
FIG. 11 is an outline perspective view illustrating the AC busbar disassembled.

FIG. 10 is an outline perspective view illustrating a peripheral structure of the AC busbar 115 and the busbar insert part 25. FIG. 11 is an outline perspective view illustrating the AC busbar 115 disassembled.

The AC busbar 115 is comprised of three busbars. In detail, the U-phase AC busbar 120, the V-phase AC busbar 130, and the W-phase AC busbar 140 have first busbars 121, 131, and 141 connected to the power module 114, second busbars 122, 132, and 142 connected to the first busbars 121, 131, and 141, and third busbars 123, 133, and 143 connected to the second busbars 122, 132, and 142, respectively.

The first busbars 121, 131, and 141 have first parts 121A, 131A, and 141A connected to the power module 114 and extending forward, and second parts 121B, 131B, and 141B extending downwardly from front ends of the first parts 121A, 131A, and 141A, respectively. In the first busbars 121, 131, and 141, the first parts 121A, 131A, and 141A and the second parts 121B, 131B, and 141B are formed integrally. For example, in the first busbars 121, 131, and 141, the first parts 121A, 131A, and 141A and the second parts 121B, 131B, and 141B are formed by bending plate-shaped metal members.

The first parts 121A, 131A, and 141A have a plate shape, and extend forward from the power module 114 in a posture extending substantially horizontally. As described above, the parts corresponding to the U-phase, the V-phase, and the W-phase of the power module 114 are lined up in the left-and-right direction. Corresponding to this, the first parts 121A, 131A, and 141A of the first busbars 121, 131, and 141 extend in the left-and-right direction and are parallel to each other. In this embodiment, the part corresponding to the U-phase of the power module 114 and the first part 121A of the U-phase connected to this part, the part corresponding to the V-phase of the power module 114 and the first part 131A of the V-phase connected to this part, and the part corresponding to the W-phase of the power module 114 and the first part 141A of the W-phase connected to this part are lined up in this order from the left side.

The second busbars 122, 132, and 142 have a plate shape. The second busbars 122, 132, and 142 are disposed in the up-and-down direction at a position separated downwardly from the power module 114 in a posture extending in the left-and-right direction and substantially horizontally. The second busbars 122, 132, and 142 are lined up in the front-and-rear direction. The most rearward second busbar is disposed in the front-and-rear direction so that its front edge is located rearward of a front edge of the first part of the corresponding first busbar. In this embodiment, the second busbars 122, 132, and 142 are lined up in order of the W-phase, the U-phase, and the V-phase from the rear side, and, a front edge of the second busbar 142 of the W-phase AC busbar 140 is located rearward of a front edge of the first part 141A of the W-phase AC busbar 140.

The second busbars 122, 132, and 142 are held by a busbar coupling member 170 in a posture in which they are parallel to each other. The busbar coupling member 170 is an insulation member extending in the front-and-rear direction and the left-and-right direction. Right parts of the second busbars 122, 132, and 142 are inserted into the busbar coupling member 170, and, thereby, the three second busbars 122, 132, and 142 are held by the busbar coupling member 170.

The second parts 121B, 131B, and 141B of the first busbars 121, 131, and 141 extend in the up-and-down direction between front ends of the corresponding first parts 121A, 131A, and 141A and left end parts of the corresponding second busbars 122, 132, and 142. Here, as described above, the front edge of the second busbar 142 of the W-phase AC busbar 140 is located rearward of the front edge of the first part 141A of the W-phase AC busbar 140. Thus, the second part 141B of the W-phase AC busbar 140 is bent rearwardly at an intermediate location in the up-and-down direction.

Lower end parts of the second parts 121B, 131B, and 141B, and left end parts of the second busbars 122, 132, and 142 are coupled to each other with bolts and nuts. Note that in FIG. 10, illustration of the bolts and the nuts which couple these end parts is omitted.

The third busbars 123, 133, and 143 have a plate shape, and extends rightwardly from right ends of the second busbars 122, 132, and 142 in a posture extending substantially horizontally. The third busbars 123, 133, and 143 are lined up in order of the W-phase, the U-phase, and the V-phase from the rear side corresponding to the second busbars 122, 132, and 142.

In this embodiment, the third busbars 123, 133, and 143 are held by a motor side connector 180 in a posture in which the busbars are parallel to each other. The motor side connector 180 includes a surrounding part 181 which has a substantially cylindrical shape extending in the left-and-right direction and surrounds the busbar coupling member 170, a flange part 182 which is fixed to the right end of the surrounding part 181 and extends radially outward from an outer circumferential surface of the surrounding part 181, and a busbar holding part 183 which is fixed to the inside of the surrounding part 181 and extends in the left-and-right direction. Three spaces lined up in the front-and-rear direction are defined in the busbar holding part 183, and the third busbars 123, 133, and 143 are fixed to the inside of the respective spaces. In this embodiment, by inserting the busbar coupling member 170 into the surrounding part 181, the third busbars 123, 133, and 143 and the corresponding second busbars 122, 132, and 142 are electrically connected to each other inside of the surrounding part 181 and the busbar coupling member 170, respectively.

The first parts 121A, 131A, and 141A of the first busbars 121, 131, and 141 are disposed inside the first accommodating part 104. On the other hand, the second busbars 122, 132, and 142 are disposed inside the second accommodating part 105, and the second parts 121B, 131B, and 141B of the first busbars 121, 131, and 141 which couple the first busbars 121, 131, and 141 to the second busbars 122, 132, and 142 extend in the up-and-down direction between the first accommodating part 104 and the second accommodating part 105, respectively. That is, upper parts of the second parts 121B, 131B, and 141B are disposed inside the first accommodating part 104, and their lower parts are disposed inside the second accommodating part 105.

The third busbars 123, 133, and 143 are supported by the case 101 in a state where they protrude outwardly from case 101.

In detail, a part which is a lower part of the front end part of the right side surface of the case 101 and constitutes a lower part of the right side surface of the second accommodating part 105 is provided with a busbar holding part 106 which protrudes rightwardly. A through-hole 106A which communicates with an inside space of the second accommodating part 105 (the second space C2) and extends in the left-and-right direction is formed in the busbar holding part 106. The motor side connector 180 is held by the case 101 in a state where the flange part 182 is located on the right side of the busbar holding part 106 and the surrounding part 181 is inserted into the through-hole 106A of the busbar holding part 106. Thus, right end parts of third busbars 123, 133, and 143 (i.e., end parts of the AC busbar 115 on the motor M side) protrude rightwardly from the lower part of the front end part of the right side surface of the case 101.

The right end parts of the third busbars 123, 133, and 143 (i.e., the end parts of the AC busbar 115 on the motor M side) are inserted into the busbar insert part 25 and are electrically connected with the motor M inside of the busbar insert part 25. In detail, the three busbars electrically connected with the coils of the respective phases of the motor M are disposed inside the busbar insert part 25. By fastening the busbars corresponding to the phases on the motor M side to the end parts of the busbars corresponding to the phases of the AC busbar 115 inside the busbar insert part 25, the AC busbar 115 (as well as the power converter 100) and the motor M are electrically connected with each other. Here, as described above, the opening 25A of the busbar insert part 25 opens to the left in the left side surface of the busbar insert part 25. Thus, the end part of the AC busbar 115 on the motor M side is inserted into the busbar insert part 25 from the left

Operation

As described above, in the above embodiment, the DC busbar 111, the filter 112, the smoothing capacitor 113, and the power module 114 are lined up in the front-and-rear direction. Therefore, the dimensions of the spaces in the up-and-down direction and the left-and-right direction occupied by these components, and the dimensions of the first accommodating part 104 in the up-and-down direction and the left-and-right direction which accommodates these components can be reduced. Further, the DC busbar 111, the filter 112, the smoothing capacitor 113, and the power module 114 are lined up in this order.

That is, the order of transferring the electric power is the same as the lined-up order of these components. Therefore, the distance between the components which give and receive the electric power can be reduced, and the inductance and the impedance can be reduced. In detail, the first coupling busbar 105A which couples the DC busbar 111 to the filter 112, the second coupling busbar 105B which couples the filter 112 to the smoothing capacitor 113, and the third coupling busbar 105C which couples the smoothing capacitor 113 to the power module 114 can be reduced in the lengths in the front-and-rear direction, thereby reducing the inductance and the impedance.

Further, the AC busbar 115 extends downwardly from the power module 114. Therefore, the space which is occupied by the DC busbar 111, the smoothing capacitor 113, the power module 114, and the AC busbar 115 (i.e., the dimensions of the case 101 and the power converter 100 in the front-and-rear direction) can be reduced.

In addition, the second accommodating part 105 which protrudes downwardly from the front end part of the first accommodating part 104 is provided to the case 101, and the lower part of the AC busbar 115 is accommodated in the second accommodating part 105. That is, only the part of the case 101 corresponding to the AC busbar 115 is formed in the shape extending in the up-and-down direction. Therefore, the AC busbar 115 can be accommodated inside the case 101, while reducing the dimension of the first accommodating part 104 of the case 101 in the up-and-down direction, and reducing the volume of the entire case 101.

Further, the second accommodating part 105 is disposed at a position forward of the outer circumferential surfaces of the upper parts of the motor housing 22 and the axle housing 23 (the outer circumferential surfaces curving so as to bulge upwardly, when seen in the left-and-right direction), and offset forward from the upper end parts of the outer circumferential surfaces (i.e., a top part of the curved part). Therefore, a space forward of the curved outer circumferential surfaces of the motor housing 22 and the axle housing 23 can be used as an installation space of the second accommodating part 105. That is, like the above embodiment, the second accommodating part 105 can be disposed forward of the housings 22 and 23 so as to extend from the position slightly above the upper end parts of the outer circumferential surfaces of the housings 22 and 23 to the position below the upper ends, and the height of the entire case 101 and the entire power converter 100 can be lowered. Therefore, according to the above embodiment, the power converter 100 can be disposed around the motor housing 22 and the axle housing 23 compactly with an increased degree of freedom in the layout.

Here, since the height of the power converter 100 is lowered as described above, a comparatively large space can be secured above the power converter 100. In the above embodiment, the low-voltage battery 300 is disposed in this space. In particular, since the low-voltage battery 300 is disposed so that a part thereof overlaps with the power converter 100 in the plan view, the low-voltage battery 300 and the power converter 100 can be disposed compactly around the engine body 1.

Further, in the above embodiment, the case 101 (as well as the power converter 100) is disposed in the up-and-down direction between the specific apparatus 70 provided so as to protrude to the left side from the left side surface 1A of the engine body 1, and the motor housing 22 and the axle housing 23 so that a part of the case 101 overlaps with the specific apparatus 70 in the plan view. Therefore, the power converter 100 can certainly be disposed around the engine body 1 compactly by utilizing the gap in the up-and-down direction between the specific apparatus 70, and the motor housing 22 and the axle housing 23.

In the above embodiment, the front end position of the case 101 (as well as the power converter 100) is located rearward of the front end of the front cover 21 (i.e., the front end position of the housing 20). Therefore, in a collision of the vehicle, the front cover 21 can collide, prior to the power converter 100, a device disposed forward thereof or a colliding object to reduce a load applied to the power converter 100.

Further, in the above embodiment, the busbar insert part 25 into which the AC busbar 115 is inserted is provided to the front end parts of the front cover 21 and the motor housing 22, and the AC busbar 115 is inserted into the busbar insert part 25 from the left (i.e., in the left-and-right direction). That is, by moving the power converter 100 in the left-and-right direction with respect to the front cover 21 and the motor housing 22, the AC busbar 115 is inserted into the busbar insert part 25 to couple the power converter 100 to the housing 20 (as well as the motor M). Therefore, the dimension of the space in the up-and-down direction to be secured around the power converter 100, which is a work space required for the inserting work of the AC busbar 115 into the busbar insert part 25, and the coupling work of the power converter 100 to the motor M, can be reduced. Therefore, inserting of the AC busbar 115 into the busbar insert part 25, and coupling of the power converter 100 to the motor M are enabled, while the installation space of the power converter 100 and the specific apparatus 70 can be secured by reducing the gap size in the up-and-down direction between the power converter 100 and the specific apparatus 70.

Modifications

Although in the above embodiment the housing 20 is disposed on the left side of the engine body 1, the housing 20 may be disposed on the right side of the engine body 1. Further, the housing 20 and the engine body 1 may be lined up in the front-and-rear direction. Note that if the housing 20 and the engine body 1 are lined up in the front-and-rear direction (in the front-and-rear direction of the vehicle), the front-and-rear direction is an example of the "first direction" in the present disclosure, and the left-and-right direction (the vehicle width direction) is an example of the "second direction" in the present disclosure.

Although in the above embodiment the front end position of the case 101 (as well as the power converter 100) is located rearward of the front end of the front cover 21 (i.e., the front end position of the housing 20), the front end position of the case 101 (as well as the power converter 100) may be located forward of the front end position of the housing 20, and rearward of the front end position of the engine body 1. Also in this case, the power converter 100 is protected by the engine body 1, and the load applied to the power converter 100 in a collision of the vehicle can be reduced. Further, the front end position of the case 101 (as well as the power converter 100) may be located forward of the front end positions of both the housing 20 and the engine body 1. Note that as described above, if the front end position of the power converter 100 is located rearward of the front end position of at least one of the housing 20 and the engine body 1, the load applied to the power converter 100 in a collision of the vehicle can be reduced.

Although in the above embodiment the low-voltage battery 300 is disposed above the power converter 100, an air filter may be disposed instead of the low-voltage battery 300.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
7A EGR Cooler (Peripheral Equipment)
7B EGR Cooler Connecting Part (Peripheral Equipment)
7C EGR Valve Unit (Peripheral Equipment)
8 Fuel Pump (Peripheral Equipment)
20 Housing
21 Front Cover
22 Motor Housing
23 Axle Housing
70 Specific Apparatus (Peripheral Equipment)
100 Power Converter
101 Case
104 First Accommodating Part
105 Second Accommodating Part
113 Smoothing Capacitor
114 Power Module
116 Control Circuit Board
111 DC Busbar
115 AC Busbar
M Motor
E Engine

What is claimed is:

1. A powertrain structure of a vehicle, comprising:
an engine serving as a driving source configured to propel the vehicle, the engine including an engine body where a combustion chamber is formed;
a motor serving as a driving source configured to propel the vehicle;
a battery configured to supply electric power to the motor;
a power converter configured to convert direct current (DC) of the battery into alternating current (AC), and supply the alternating current to the motor; and
a housing configured to accommodate the motor therein, the housing being disposed on one side of the engine body in a horizontal first direction,
wherein the power converter includes:
a DC busbar coupled to the battery;

a smoothing capacitor configured to smooth the direct current inputted from the battery via the DC busbar, the smoothing capacitor being disposed on one side of the DC busbar in a horizontal second direction perpendicular to the first direction;
a power module configured to convert the direct current smoothed by the smoothing capacitor into alternating current, the power module being disposed on one side of the smoothing capacitor in the second direction;
an AC busbar configured to transmit alternating current generated by the power module to the motor, the AC busbar having a shape extending downwardly from the power module and being connected with the motor; and
a case configured to accommodate the DC busbar, the smoothing capacitor, the power module, and the AC busbar, the case having:
a first accommodating part having a shape extending in the second direction, and accommodating the power module, the smoothing capacitor, and the DC busbar; and
a second accommodating part having a shape protruding downwardly from an end of the first accommodating part on the one side in the second direction, and accommodating a lower part of the AC busbar,
wherein the housing includes a curved part with an outer circumferential surface curved so as to bulge upwardly when seen in the first direction, and
wherein the case is disposed above the curved part in a state where a position of the second accommodating part is offset from a top part of the curved part to the one side in the second direction.

2. The powertrain structure of claim 1,
wherein the engine body, the motor, and the power converter are mounted on the vehicle in a posture in which the first direction is in agreement with a vehicle width direction, and the second direction is in agreement with a front-and-rear direction of the vehicle,
wherein the engine has peripheral equipment disposed at a position on the one side of the engine body in the first direction, and separated upwardly from the housing, and
wherein the power converter is disposed at a position below the peripheral equipment and above the housing, and rearward of a front end of at least one of the engine and the housing.

3. The powertrain structure of claim 2,
wherein the power converter is mounted on the vehicle in a posture in which the one side in the second direction is in agreement with a front side in the front-and-rear direction of the vehicle, and
wherein the housing includes a busbar insert part into which the AC busbar is inserted in the vehicle width direction, the busbar insert part being provided to a front end part of the housing.

4. The powertrain structure of claim 1, further comprising a low-voltage battery with an output voltage lower than the battery,
wherein the low-voltage battery is disposed above the power converter, and on the one side of the engine body in the first direction.

5. The powertrain structure of claim 2, further comprising a low-voltage battery with an output voltage lower than the battery, wherein the low-voltage battery is disposed above the power converter, and on the one side of the engine body in the first direction.

6. The powertrain structure of claim 3, further comprising a low-voltage battery with an output voltage lower than the battery, wherein the low-voltage battery is disposed above the power converter, and on the one side of the engine body in the first direction.

\* \* \* \* \*